(12) United States Patent
Verleene et al.

(10) Patent No.: US 10,787,721 B2
(45) Date of Patent: Sep. 29, 2020

(54) DRAWING PROCESS AND WIRE OBTAINED BY DRAWING PROCESS

(71) Applicant: COMPAGNIE GENERALE DES ETABLISSEMENTS MICHELIN, Clermont-Ferrand (FR)

(72) Inventors: Arnaud Verleene, Clermont-Ferrand (FR); Laurent Bucher, Clermont-Ferrand (FR); Olivier Giroux, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 15/568,888

(22) PCT Filed: Apr. 21, 2016

(86) PCT No.: PCT/EP2016/058907
§ 371 (c)(1),
(2) Date: Oct. 24, 2017

(87) PCT Pub. No.: WO2016/170062
PCT Pub. Date: Oct. 27, 2016

(65) Prior Publication Data
US 2018/0100215 A1    Apr. 12, 2018

(30) Foreign Application Priority Data

Apr. 24, 2015 (FR) ..................... 15 53711

(51) Int. Cl.
*C21D 9/52* (2006.01)
*B21C 1/00* (2006.01)
(Continued)

(52) U.S. Cl.
CPC .............. *C21D 9/525* (2013.01); *B21C 1/003* (2013.01); *B21C 1/02* (2013.01); *B21C 23/002* (2013.01);
(Continued)

(58) Field of Classification Search
CPC .. B21C 1/00; B21C 1/02; B21C 1/003; C21D 7/02; C21D 8/06; C21D 9/52; C21D 9/525
See application file for complete search history.

(56) References Cited

U.S. PATENT DOCUMENTS

| 4,578,124 A | 3/1986 | Yutori et al. ................... 148/12 |
| 6,048,416 A | 4/2000 | Hauser et al. ................ 148/500 |

(Continued)

FOREIGN PATENT DOCUMENTS

| DE | 699 09 012 T2 | 4/2004 |
| JP | 2006233251 A * | 9/2006 |

(Continued)

OTHER PUBLICATIONS

Espacenet translation of JP2006233251, accessed on Oct. 24, 2018 (Year: 2006).*

(Continued)

*Primary Examiner* — Teresa M Ekiert
(74) *Attorney, Agent, or Firm* — Venable LLP

(57) ABSTRACT

A steel wire has a microstructure that is completely ferritic, a mixture of ferrite and cementite or a mixture of ferrite and pearlite and has a weight content of carbon C such that C<0.05% and a weight content of chromium Cr such that Cr<12%. The process for drawing the wire comprises: at least one first uninterrupted series of steps of drawing the wire from a diameter D to a diameter d', at least one second uninterrupted series of steps of drawing the wire of diameter d' to a diameter d, and one or more intermediate steps (Continued)

between the first and second uninterrupted series of steps of drawing the wire, the wire having a temperature less than or equal to 300° C. during the or each intermediate step.

31 Claims, 3 Drawing Sheets

(51) Int. Cl.
    *C21D 7/02* (2006.01)
    *B21C 1/02* (2006.01)
    *B21C 23/00* (2006.01)
    *C21D 8/06* (2006.01)
    *D07B 1/06* (2006.01)
    *C22C 38/18* (2006.01)
    *C22C 38/04* (2006.01)
    *B32B 15/01* (2006.01)
    *C22C 38/02* (2006.01)
    *B60C 9/00* (2006.01)
    *C22C 38/00* (2006.01)
    *C22C 38/44* (2006.01)
    *C22C 38/46* (2006.01)
    *C22C 38/52* (2006.01)
    *C22C 38/54* (2006.01)

(52) U.S. Cl.
    CPC .......... *B32B 15/013* (2013.01); *B32B 15/015* (2013.01); *B60C 9/0007* (2013.01); *C21D 7/02* (2013.01); *C21D 8/065* (2013.01); *C22C 38/001* (2013.01); *C22C 38/02* (2013.01); *C22C 38/04* (2013.01); *C22C 38/18* (2013.01); *C22C 38/44* (2013.01); *C22C 38/46* (2013.01); *C22C 38/52* (2013.01); *C22C 38/54* (2013.01); *D07B 1/066* (2013.01); *D07B 1/0606* (2013.01); *C21D 2211/003* (2013.01); *C21D 2211/005* (2013.01); *C21D 2211/009* (2013.01); *D07B 2205/305* (2013.01); *D07B 2205/3025* (2013.01); *D07B 2205/3028* (2013.01); *D07B 2205/3035* (2013.01); *D07B 2205/3042* (2013.01)

(56) References Cited

U.S. PATENT DOCUMENTS

2010/0170624 A1\* 7/2010 Hollinger ............. C10M 129/74
                                                                                       156/117
2016/0281297 A1 9/2016 Verleene et al. ....... D07B 1/066

FOREIGN PATENT DOCUMENTS

KR         100317345 B1 \* 12/2001
WO         2015/075164 A1     5/2015

OTHER PUBLICATIONS

Machine translation of KR100317345B1, Kim et al., translated on Oct. 28, 2019, pp. 1-7. (Year: 2019).\*

\* cited by examiner

DRAWING PROCESS AND WIRE OBTAINED BY DRAWING PROCESS

FIELD OF THE INVENTION

The invention relates to a process for drawing a steel wire and to a steel wire, especially for a tyre.

RELATED ART

A tyre with carcass reinforcement, for example radial carcass reinforcement, comprises a tread, two inextensible beads, two sidewalls connecting the beads to the tread and a crown reinforcement, placed circumferentially between the carcass reinforcement and the tread.

The crown and/or carcass reinforcement comprises one or more rubber plies, optionally reinforced by reinforcing elements or reinforcers such as individual metal wires or metal cords originating from the assembly of several individual metal wires. The metal reinforcers are made of steel.

The crown reinforcement generally consists of at least two superposed crown plies, sometimes referred to as "working" plies or "crossed" plies, the generally metal, reinforcing cords of which are placed virtually parallel to one another within a ply but crossed from one ply to the other, that is to say inclined, symmetrically or asymmetrically, with respect to the median circumferential plane, by an angle which is generally between 10° and 45° depending on the type of tyre in question. The cross plies may be supplemented by various other auxiliary rubber plies or layers, with widths that may vary as the case may be, and which may or may not contain reinforcers. Mention will be made, by way of example, of simple rubber cushions, plies referred to as "protective" plies responsible for protecting the rest of the crown reinforcement from external attacks or perforations, or else plies referred to as "hooping" plies comprising reinforcers oriented substantially in the circumferential direction (plies referred to as "zero-degree" plies), whether they are radially outer or inner with respect to the cross plies.

However, these metal reinforcers contribute significantly to the weight of the tyre which it is desired to lighten as much as possible, by improving, if possible, their mechanical strength.

A first solution consists in increasing the weight content of elements of the steel, for example of carbon, to a level of 0.9%, or even more, which makes it possible to increase the mechanical strength of the wires, and therefore to reduce the diameter and/or the density thereof in the reinforcing plies, and thus to lighten the tyre. A tyre is obtained that is lightened but that has a relatively modest endurance. This is because the metal reinforcers are more sensitive to fatigue and to corrosion due to the use of a relatively high carbon content by weight.

In order to manufacture such wires, a first uninterrupted series of steps of drawing the wire from a diameter D to a diameter d' is carried out. Then, the wire of diameter d' is heat-treated by heating the wire beyond the austenitizing temperature of the steel then by cooling the wire at a rate that makes it possible to obtain a predetermined microstructure of the steel. Next, a second uninterrupted series of steps of drawing the wire of diameter d' to a diameter d is carried out. In addition, prior to the second uninterrupted series of drawing steps, the process comprises a step of coating, by successive depositions, with a first layer of copper then with a second layer of zinc and also a step of thermal diffusion of the copper in the second layer and of the zinc in the first layer. Such a thermal diffusion step is carried out at around 540° C. which may give rise to a spheroidization of the microstructure of the steel, especially when this is ferritic-pearlitic steel, and render the subsequent drawing steps impossible on an industrial scale.

A second solution consists in using steels that contain a high weight content of chromium, for example described in EP 0 648 891. Such steels, generally referred to as stainless steels, make it possible to achieve a relatively high mechanical strength and also a high corrosion resistance due to the presence of chromium in the steel. However, the cost of stainless steels is very high due to the use of a high weight content of chromium.

The objective of the invention is to provide a metal reinforcer that is less sensitive to fatigue and to corrosion, that is not very expensive and that is easy to draw on an industrial scale.

BRIEF DESCRIPTION OF EMBODIMENTS OF THE INVENTION

For this purpose, one subject of the invention is a process for drawing a steel wire having a microstructure that is completely ferritic, a mixture of ferrite and cementite or a mixture of ferrite and pearlite and in which the wire has a weight content of carbon C such that $C<0.05\%$ and a weight content of chromium Cr such that $Cr<12\%$, the process comprising:
- at least one first uninterrupted series of steps of drawing the wire from a diameter D to a diameter d',
- at least one second uninterrupted series of steps of drawing the wire of diameter d' to a diameter d,
- one or more intermediate steps between the first and second uninterrupted series of steps of drawing the wire, the wire having a temperature less than or equal to 300° C. during the or each intermediate step.

DETAILED DESCRIPTION OF THE INVENTION

The wire used has a relatively low weight content of carbon C. Thus, the drawability of the wire, that is to say the possibility of obtaining a relatively small diameter d from a relatively large diameter d', is improved. In other words, the relatively low weight content of carbon C allows a high true strain $\varepsilon'=2\cdot\ln(d'/d)$ which makes it possible to sufficiently work harden the wire in order to give it sufficient or even high mechanical strength properties, in particular a sufficiently high maximum tensile strength.

Even though its maximum tensile strength may in certain cases be lower than that of wires of the prior art having a higher weight content of carbon C, the wire obtained by the process according to the invention is much less sensitive to fatigue and to corrosion, which improves the endurance of the tyre and compensates for its initial deficit in maximum tensile strength.

Furthermore, it is possible to reduce the diameter of the wire while retaining a mechanical strength sufficient for reinforcing the tyre.

The use of a steel having a relatively low weight content of carbon makes it possible to obtain a relatively inexpensive wire unlike the use of a stainless steel.

The temperature less than or equal to 300° C. during the or each intermediate step makes it possible to avoid modifying the microstructure of the steel, for example by spheroidization, which would have the effect of preventing the subsequent drawing of the wire to its final diameter d on an industrial scale.

The temperature of the wire may be measured by any technique known to those skilled in the art, for example by remote measurement, for example by infrared, or else by measurement in contact with the wire after stopping the running of the wire, for example with the aid of a thermocouple.

An uninterrupted series of drawing steps is understood to mean that the wire makes a series of successive passes through several drawing dies, each pass through each drawing die corresponding to one drawing step. Apart from the last pass, each pass through a die is followed directly by a pass through the following die. In an uninterrupted series of drawing steps, the wire does not undergo any step, in particular heat treatment step or coating step, other than a drawing step between two drawing steps of the series. In other words, the wire does not undergo any step, in particular heat treatment step or coating step, between two directly successive drawing steps of the series.

The microstructure of the steel is completely ferritic, a mixture of ferrite and cementite or a mixture of ferrite and pearlite. This microstructure is preferably observed on the wire of diameter D or d' and more preferably D.

Thus, the microstructure of the steel is free of martentite, whether acicular or globular, of bainite and of austenite.

A ferritic-martensitic microstructure, also called dual-phase microstructure, leads to cleavage between the ferritic and martensitic phases, especially during the drawing stages, which is undesirable.

A martensitic microstructure is not ductile enough to allow drawing of the wire, which would break too frequently. Moreover, in order to obtain such a martensitic microstructure, it would be necessary to cool the steel extremely rapidly which, considering the carbon content of the steel, would be industrially unfeasible.

An austenitic microstructure is unstable without the addition of alloying element(s), in particular manganese or nickel. Such an austenitic microstructure would therefore be expensive.

A ferritic, ferritic-pearlitic or ferritic-cementitic microstructure is distinguished from another microstructure, in particular martensitic or bainitic microstructure, by metallographic observation, preferably on the wire of diameter d'. The ferritic-pearlitic microstructure has ferrite grains and lamellar pearlitic regions. On the contrary, the martensitic microstructure comprises laths and/or needles that those skilled in the art will know how to distinguish from the grains and lamellae of the ferritic-pearlitic and pearlitic microstructures. Following a chemical attack of the steel by a mixture of ethanol and nitric acid, the grains of cementite are identified, which grains appear very dark under a microscope, in any case darker than the grains of the other microstructures, for example darker than the ferrite grains which then appear white.

More preferably, when the weight content of carbon C is such that $C \leq 0.02\%$, the microstructure of the steel is completely ferritic or ferritic-cementitic with, in this case, at most 0.3% of cementite.

More preferably, when the weight content of carbon C is such that $0.02\% < C \leq 0.05\%$, the microstructure of the steel is completely ferritic or ferritic-pearlitic with, in this case, at most 4% of pearlite.

The content of cementite or pearlite is determined by metallographic observation, preferably on the wire of diameter D or d' and more preferably D. The surface area of cementite or of pearlite is then determined relative to the surface area of ferrite on a cross section of the wire.

The wire is made of steel, that is to say that it consists predominantly (i.e. for more than 50% by weight) or completely (for 100% by weight) of steel as defined in the standard NF EN10020. In accordance with this standard, a steel is a material containing more iron than any other element, that has a carbon content of less than 2% and that contains other alloying elements. Still in accordance with this standard, the steel optionally comprises other alloying elements.

Preferably, the steel is an unalloyed steel as defined in the standard NF EN10020. Thus, the steel comprises, in addition to carbon and iron, other known alloying elements in amounts in accordance with the standard NF EN10020.

In another embodiment, the steel is an alloy steel as defined in the standard NF EN10020. In this embodiment, the steel comprises, in addition to the carbon and iron, other known alloying elements.

In yet another embodiment, the steel is a stainless steel as defined in the standard NF EN10020. Thus, in this embodiment, the steel comprises at least 10.5% by weight of chromium and at most 1.2% by weight of carbon.

Preferably, the wire has a temperature less than or equal to 350° C. and more preferably less than 300° C. during the or each intermediate step.

According to optional features:

d' is greater than or equal to 0.5 mm, preferably greater than or equal to 1 mm and more preferably greater than or equal to 1.3 mm. The diameter d' is large enough to obtain high mechanical properties by work hardening of the wire.

d' is less than or equal to 2.5 mm, preferably less than or equal to 2.2 mm and more preferably less than or equal to 2 mm. The diameter d' is small enough to allow work hardening to the final diameter of the wire.

According to one optional feature of the process, the first uninterrupted series of steps of drawing the wire from the diameter D to the diameter d' is carried out in a dry environment.

Dry drawing is understood to mean that the wire circulates in a gaseous environment, for example ambient air. Preferably, the drawing lubricant during dry drawing is in pulverulent form. During dry drawing, the pulling means, for example capstans, are exposed to the ambient air.

According to another optional feature of the process, the second uninterrupted series of steps of drawing the wire from the diameter d' to the diameter d is carried out in a wet environment.

Wet drawing is understood to mean that the wire circulates in a liquid environment, for example an aqueous solution. Preferably, the drawing lubricant during wet drawing is in liquid form. During wet drawing, the pulling means, for example capstans, are exposed to the liquid environment, for example the aqueous solution.

Such dry and wet drawing steps and also the means used for implementing them are in particular described in detail in the document "Les Sélections" [The Selections]—Techniques de l'Ingénieur, m 3125, Tréfilage de lacier [Steel drawing], André Lefort".

In one embodiment, d' and d being expressed in mm, the true strain $\varepsilon' = 2 \cdot \ln(d'/d)$ is such that $\varepsilon' > 3$. Preferably $\varepsilon' \leq 5$.

In certain embodiments, $\varepsilon' \geq 3.5$, more preferably $\varepsilon' \geq 3.7$ and more preferably still $\varepsilon' \geq 4$. In certain other embodiments, $\varepsilon' \leq 4.7$ and preferably $\varepsilon' \leq 4.5$.

In one embodiment, D and d' being expressed in mm, the true strain $\varepsilon = 2 \cdot \ln(D/d')$ is such that $\varepsilon \geq 2$. Preferably $\varepsilon \leq 5$.

In certain embodiments, preferably in those for which $\varepsilon' \geq 4$ and more preferably $\varepsilon' \geq 4.5$, D and d' being expressed in mm, the true strain ε=2·ln (D/d') is such that ε≤4, preferably ε≤3.5 and more preferably ε≤3.

In other embodiments, preferably in those for which ε'≤4.7, more preferably in those for which ε'≤4.5, D and d' being expressed in mm, the true strain ε=2·ln (D/d') is such that ε≥2.3, preferably ε≥2.5 and more preferably ε≥2.7.

Thus, the drawing of the wire is limited from the diameter D to the diameter d' which makes it possible to sufficiently work harden the wire during the second uninterrupted series of steps of drawing the wire from the diameter d' to the diameter d in order to increase its mechanical tensile strength R.

Preferably, D and d being expressed in mm, the true strain εT=2·ln (D/d) is such that εT≥6, preferably εT≥6.5 and more preferably εT≥7.

In preferred embodiments, εT≤8.

Optionally, D is greater than or equal to 4 mm, preferably greater than or equal to 5 mm.

Preferably, the intermediate step or steps do not comprise a step of heating the steel beyond its austenitizing temperature.

Thus, the intermediate step or steps do not comprise a step, generally referred to as a heat treatment step, during which the wire is heated beyond its austenitizing temperature in order to obtain an austenitic microstructure and then the wire is cooled in order to obtain a predetermined microstructure. The austenitizing temperature is generally between 700 and 900° C.

In one preferred embodiment, the intermediate step or steps comprise a step of coating the wire of diameter d' with at least one metal layer.

Preferably, the step of coating the wire of diameter d' is selected from a step of depositing a layer of an alloy of substantially pure metals, a step of depositing a first layer of a first substantially pure metal followed by a step of depositing a second layer of a second substantially pure metal, and a step of depositing a layer of a substantially pure metal.

A substantially pure metal is understood to mean a metal comprising at least 90%, preferably at least 95% and preferably at least 99% of a single metallic chemical element. An alloy of substantially pure metals is understood to mean a mixture of at least two different metals, each metal being substantially pure, and together constituting more than 50% by weight of the alloy. Thus, an alloy may comprise additives that provide specific properties to the alloy as a function of the use thereof.

For example, the step of depositing a layer of an alloy of substantially pure metals may be a step of depositing a layer of the alloy, for example of brass or bronze. This type of deposition step is generally referred to as co-deposition since the substantially pure metals constituting the alloy are deposited simultaneously from nuggets of the alloy.

For example, the substantially pure metals are selected from copper, zinc, tin, aluminium, cobalt and nickel and preferably from copper, zinc and tin.

In one preferred embodiment, the step of coating the wire of diameter d' comprising a step of depositing a first layer of a first substantially pure metal followed by a step of depositing a second layer of a second substantially pure metal, the intermediate step or steps do not comprise a step of thermal diffusion of each first and second metal respectively into the second and first layer.

Another subject of the invention is a steel wire of diameter d expressed in mm, having a microstructure that is completely ferritic, a mixture of ferrite and cementite or a mixture of ferrite and pearlite and having a weight content of carbon C such that C<0.05%, a weight content of chromium Cr such that Cr<12% and a maximum tensile strength R, expressed in MPa, such that R≥A+910.C−600.ln(d) with A=200.

The maximum tensile strength or ultimate tensile strength corresponds to the force necessary to break the wire. The measurements of maximum tensile strength, denoted by R (in MPa), are carried out according to the ISO 6892 standard of 1984.

Such a wire is not very sensitive to fatigue and to corrosion, not very expensive and easy to manufacture by drawing on an industrial scale.

In one embodiment, the wire has a weight content of carbon C such that 0.01%≤C<0.05%, preferably 0.01%≤C≤0.045%, and more preferably 0.01%≤C≤0.04%.

Advantageously, A=400, preferably A=600 and more preferably A=700.

Advantageously, R≥1000 MPa, preferably R≥1600 MPa and more preferably R≥1800 MPa.

Advantageously, d is greater than or equal to 0.10 mm and preferably greater than or equal to 0.12 mm.

When the diameter d is too small, the industrial production cost of the wire becomes too high and incompatible with mass production.

Advantageously, d is less than or equal to 0.40 mm, preferably less than or equal to 0.25 mm, more preferably less than or equal to 0.23 mm and more preferably still less than or equal to 0.20 mm.

When the diameter d is too large, the flexibility and endurance of the wire are too low for a use of the wire in certain plies of the tyre, in particular the carcass reinforcement, for example for a vehicle of the heavy-duty vehicle type.

Another subject of the invention is a cord comprising several wires as defined above.

For example, the cords are of layered type or of stranded type.

It is recalled that there are two possible techniques for assembling wires or strands:
either by cabling: in which case the wires or strands undergo no twisting about their own axis, because of a synchronous rotation before and after the assembling point;
or by twisting: in which case the wires or strands undergo both a collective twist and an individual twist about their own axis, thereby generating an untwisting torque on each of the wires or strands.

Another subject of the invention is a semi-finished element, comprising a rubber matrix in which at least one wire as defined above is embedded.

The rubber matrix comprises at least one diene elastomer, a reinforcing filler, a vulcanization system and various additives.

The diene elastomer of the rubber matrix is generally understood to mean an elastomer resulting at least in part (i.e. a homopolymer or a copolymer) from diene monomers (monomers bearing two conjugated or non-conjugated carbon-carbon double bonds).

Diene elastomers, in a known way, can be classified into two categories: those said to be "essentially unsaturated" and those said to be "essentially saturated". Particularly preferably, the diene elastomer of the rubber matrix is selected from the group of (essentially unsaturated) diene elastomers consisting of polybutadienes (BR), synthetic polyisoprenes (IR), natural rubber (NR), butadiene copolymers, isoprene copolymers and mixtures of these elastomers. Such copolymers are more preferably chosen from the group consisting of butadiene/styrene copolymers (SBR), isoprene/butadiene copolymers (BIR), isoprene/styrene copolymers (SIR), isoprene/butadiene/styrene copolymers (SBIR) and mixtures of such copolymers.

The rubber matrix may contain a single diene elastomer or a mixture of several diene elastomers, it being possible for the diene elastomer(s) to be used in combination with any type of synthetic elastomer other than a diene elastomer, or even with polymers other than elastomers, for example thermoplastic polymers.

As reinforcing filler, use is preferably made of carbon black or an inorganic filler. More particularly, all carbon blacks, especially the blacks of HAF, ISAF and SAF type, conventionally used in tyres, are suitable as carbon blacks. As nonlimiting examples of such blacks, mention may be made of the N115, N134, N234, N330, N339, N347 and N375 blacks. However, the carbon black may of course be used as a blend with reinforcing fillers and in particular other inorganic fillers. Such inorganic fillers include silica, especially highly dispersible silicas, for example the Ultrasil 7000 and Ultrasil 7005 silicas from Degussa.

Finally, a person skilled in the art will understand that, as filler equivalent to the reinforcing inorganic filler described in the present section, use might be made of a reinforcing filler of another nature, in particular organic nature, provided that this reinforcing filler is covered with an inorganic layer, such as silica, or else comprises functional sites, in particular hydroxyl sites, at its surface which require the use of a coupling agent in order to form the bond between the filler and the elastomer.

It is also possible to add to the reinforcing filler, depending on the targeted application, inert (non-reinforcing) fillers such as clay particles, bentonite, talc, chalk and kaolin, that can be used for example in sidewalls or treads of coloured tyres.

The rubber matrix may also comprise all or some of the standard additives customarily used in the elastomer compositions intended for the manufacture of tyres, such as for example plasticizers or extending oils, whether the latter are of aromatic or non-aromatic nature, pigments, protective agents, such as antiozone waxes, chemical antiozonants, antioxidants, antifatigue agents, reinforcing resins, methylene acceptors (for example phenolic novolac resin) or methylene donors (for example HMT or H3M) as described, for example, in application WO 02/10269 (or US 2003/0212185).

The rubber matrix also comprises a vulcanization system based either on sulphur or on sulphur donors and/or on peroxide and/or on bismaleimides, vulcanization accelerators and vulcanization activators.

The actual vulcanization system is preferably based on sulphur and on a primary vulcanization accelerator, in particular an accelerator of sulphenamide type, such as selected from the group consisting of 2-mercaptobenzothiazyl disulphide (MBTS), N-cyclohexyl-2-benzothiazyl sulphenamide (CBS), N, N-dicyclohexyl-2-benzothiazyl sulphenamide (DCBS), N-tert-butyl-2-benzothiazyl sulphenamide (TBBS), N-tert-butyl-2-benzothiazyl sulphenimide (TBSI) and mixtures of these compounds.

A further subject of the invention is a tyre comprising at least one wire as defined above.

Preferably, the tyre is intended for passenger vehicles, industrial vehicles selected from vans, heavy vehicles such as heavy-duty vehicles (i.e. underground trains, buses, heavy road transport vehicles (lorries, tractors, trailers) and off-road vehicles), agricultural or civil engineering machinery, aircraft, and other transport or handling vehicles. More preferably, the tyre is intended for heavy vehicles, agricultural or civil engineering machinery, aircraft, and other transport or handling vehicles.

Preferably, the wire is intended to reinforce a tyre crown and/or carcass reinforcement. More preferably, the wire is intended to reinforce a tyre carcass reinforcement.

Preferably, the tyre is for a vehicle of the heavy-duty vehicle type, comprising a carcass reinforcement comprising at least one wire as described above.

BRIEF DESCRIPTION OF THE FIGURES

The invention will be better understood on reading the following description, given solely by way of nonlimiting example and with reference to the drawings in which.

EXAMPLE OF A TYRE ACCORDING TO THE INVENTION

Figure 1:
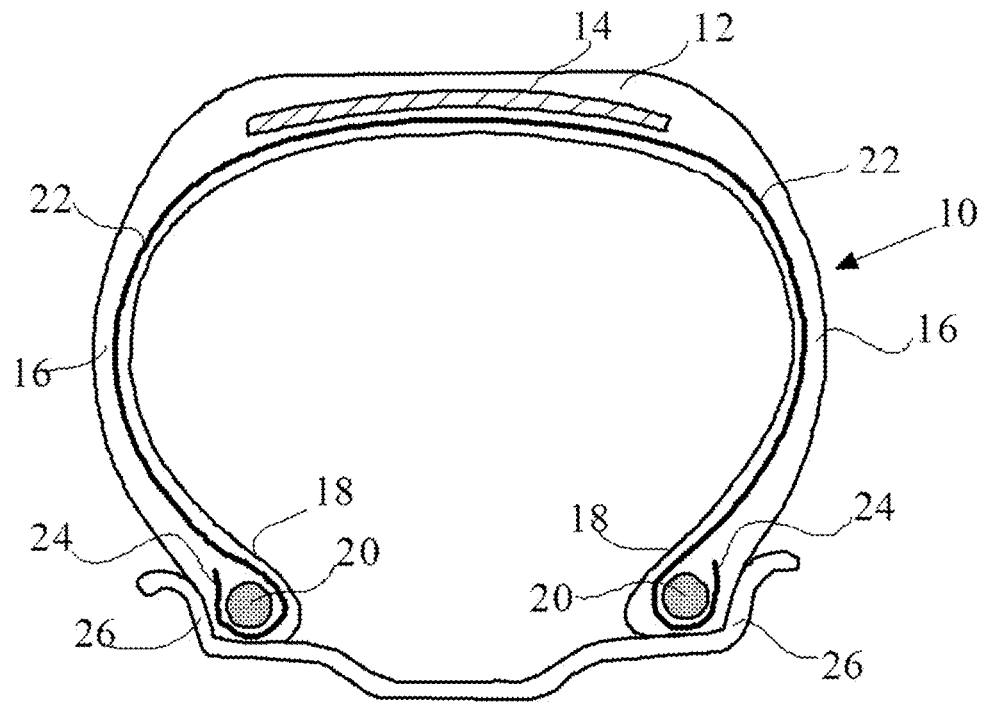
FIG. 1 is a cross-sectional view perpendicular to the circumferential direction of a tyre according to the invention.

FIG. 1 depicts a tyre comprising wires obtained by the process according to the invention and that is denoted by the general reference 10.

The tyre 10 has a crown 12 reinforced by a crown reinforcement 14, two sidewalls 16 and two beads 18, each of these beads 18 being reinforced with a bead wire 20. The crown 12 is surmounted by a tread, not shown in this schematic figure. A carcass reinforcement 22 is wound around the two bead wires 20 in each bead 18 and comprises a turn-up 24 positioned towards the outside of the tyre 10, which is shown fitted onto a wheel rim 26 here.

The carcass reinforcement 22, in a manner known per se, consists of at least one ply reinforced by wires or cords. These wires or cords of the carcass reinforcement are referred to as "radial" wires or cords, that is to say that these wires or cords are positioned virtually parallel to one another and extend from one bead to the other so as to form an angle of between 80° and 90° with the median circumferential plane (plane perpendicular to the axis of rotation of the tyre which is situated midway between the two beads 18 and passes through the middle of the crown reinforcement 14).

The crown reinforcement 14 comprises at least one ply reinforced by wires or cords in accordance with the invention. In this crown reinforcement 14 that is depicted in a very simple manner in FIG. 1, it will be understood that the wires or cords of the invention may for example reinforce all or some of the working crown plies or triangulation crown plies (or half plies) and/or protective crown plies, when such triangulation or protective crown plies are used. Besides the working plies, and the triangulation and/or protective plies, the crown reinforcement 14 of the tyre of the invention may of course comprise other crown plies, for example one or more hooping crown plies.

Of course, the tyre 10 additionally comprises, in a known manner, an inner rubber or elastomer layer (commonly referred to as "inner liner") which defines the radially inner face of the tyre and which is intended to protect the carcass reinforcement from the diffusion of air originating from the space inside the tyre. Advantageously, in particular in the case of a tyre for a heavy-duty vehicle, it may also comprise an intermediate reinforcing elastomer layer which is located between the carcass reinforcement and the inner layer, intended to reinforce the inner layer and, consequently, the carcass reinforcement, and also intended to partially delocalize the stresses to which the carcass reinforcement is subjected.

The tyre is manufactured by assembling the various elements described above present in the form of semi-finished elements comprising a rubber matrix in which the wires or cords are embedded.

Example of a Cord According to the Invention

In the case where the crown and/or carcass reinforcement is reinforced by cords, these are manufactured by assembling several steel wires in accordance with the invention, either by cabling or by twisting.

In the case of a tyre for industrial vehicles selected from vans, heavy vehicles such as heavy-duty vehicles (i.e. underground trains, buses, heavy road transport vehicles (lorries, tractors, trailers) and off-road vehicles), agricultural or civil engineering machinery, aircraft, and other transport or handling vehicles, the crown and/or carcass reinforcement is reinforced by cords in accordance with the invention in particular selected from layered cords of 1+3+8, 1+6+11, 1+6+12, 2+7, 3+8, 3+9 and 3+9+15 structure and stranded cords of 3×(1+5), (1+6)×(3+8), (1+6)×(3+9+15) and (1+6)×(4+10+16) structure. Other cords that can reinforce the crown and/or carcass reinforcement are also described in document WO 2010/139583.

In the case of a tyre for passenger vehicles, the crown and/or carcass reinforcement is reinforced by cords in accordance with the invention and in particular selected from the cords of 2+1, 2+2, 2+4 and 4×3 structure.

The cords in accordance with the invention may be rubberized in situ, as is described, inter alia, in document WO 2010/139583.

The crown and/or carcass reinforcement may also be reinforced by one or more individual wires in accordance with the invention but that are not assembled.

Example of a Wire According to the Invention

The wire is made of steel. Preferably, the steel is an unalloyed steel as defined in the standard NF EN10020. Wires made of alloy steel or stainless steel as defined in the standard NF EN10020 can also be envisaged.

The steel used may therefore preferably comprise known alloying elements such as for example Mn, Si, P, S, N, V, Cr, Mo, Ni, B and Co (see, for example, *Research Disclosure 34984—"Micro-alloyed steel cord constructions for tyres"*—May 1993; *Research Disclosure 34054—"High tensile strength steel cord constructions for tyres"*—August 1992) that make it possible to adapt the steel.

The preferred unalloyed steel in accordance with the standard NF EN10020 comprises at most 1.65%, preferably at most 1.30% and more preferably still at most 1% and very preferably at most 0.5% by weight, here 0.273% by weight of Mn.

The preferred unalloyed steel in accordance with the standard NF EN10020 comprises at most 0.60% by weight, here 0.039% by weight of Si.

The preferred unalloyed steel in accordance with the standard NF EN10020 comprises at most 0.10% by weight, here 0.011% by weight of P.

The preferred unalloyed steel in accordance with the standard NF EN10020 comprises at most 0.10% by weight, here 0.011% by weight of S.

The preferred unalloyed steel in accordance with the standard NF EN10020 comprises at most 0.10% by weight of nitrogen, at most 0.10% by weight of vanadium, at most 0.30% by weight of chromium, at most 0.08%, limit included, by weight of molybdenum, at most 0.3%, limit included, by weight of nickel, at most 0.0008%, limit included, by weight of boron and at most 0.3%, limit included, by weight of cobalt. Here, unalloyed steel comprises negligible amounts of nitrogen, vanadium, chromium, molybdenum, nickel, boron and cobalt present in the form of impurities In the case of an alloy steel in accordance with the standard NF EN10020, the steel used comprises a weight content of chromium Cr such that Cr<10.5%, preferably such that Cr≤5%, more preferably such that Cr≤1%, and more preferably still such that Cr≤0.2%.

The values of the weight contents of the elements described above may be measured according to the standard FD CEN/TR 10261 entitled "Iron and steel—European standards for the determination of chemical composition".

Figure 3:
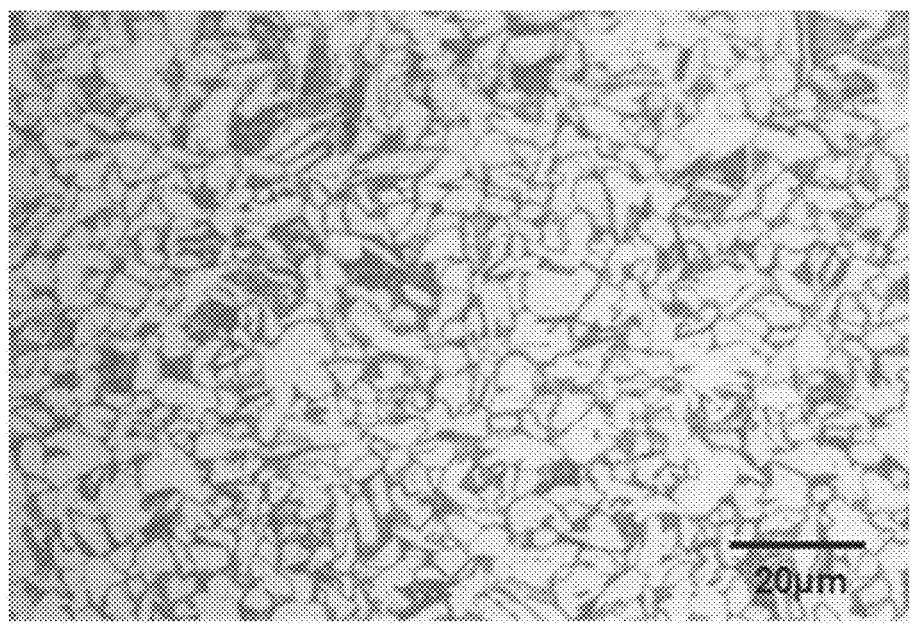
FIG. 3 is an optical microscope view of a ferritic-pearlitic microstructure.
Figure 4:
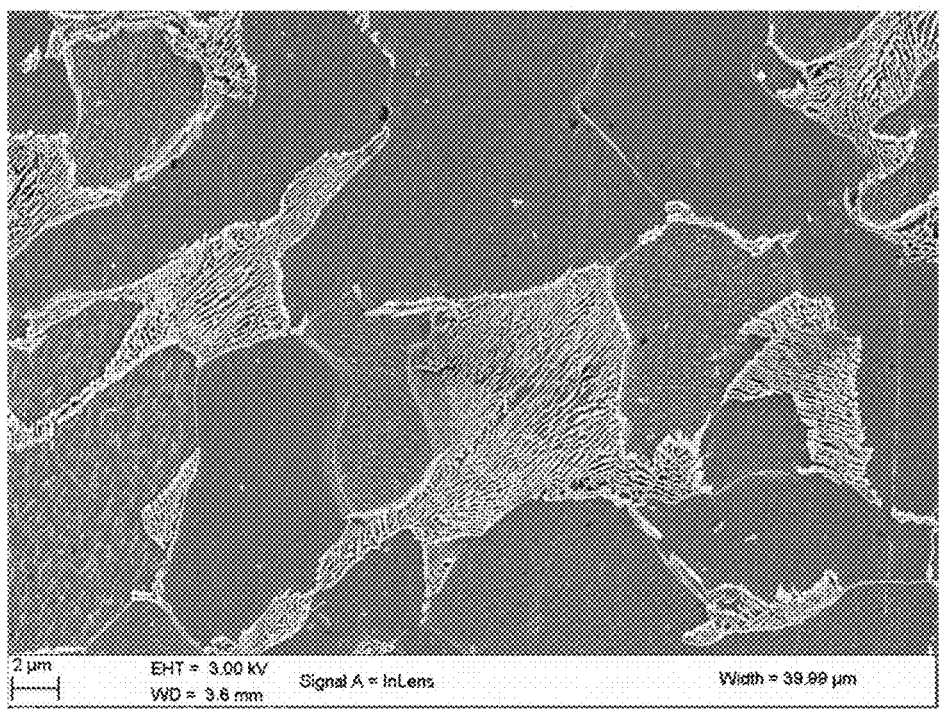
FIG. 4 is a scanning electron microscope view of a ferritic-pearlitic microstructure.

The microstructure of the steel is selected from ferrite, a mixture of ferrite and cementite or a mixture of ferrite and pearlite. The wire is preferably made of ferritic steel, illustrated in FIGS. 3 and 4. The steel used comprises a content of carbon C, expressed in %, by weight of steel such that C<0.05%. Preferably, 0.01%≤C<0.05%, preferably 0.01%≤C≤0.045% and more preferably still 0.01%≤C≤0.045%.

The wire may be coated with a metal layer that improves, for example, the processing properties of the wire, or the usage properties of the wire, of the cord and/or of the tyre themselves, such as the adhesion, corrosion resistance or else ageing resistance properties. The wire is coated with a coating selected from a layer of an alloy of substantially pure metals, for example of brass or bronze, a first layer of a first substantially pure metal, for example copper, itself coated with a second layer of a second substantially pure metal, for example zinc, and a layer of a substantially pure metal, for example zinc. As a variant, the wire may have no metal coating.

Given in Table 1 below are wires EDT1, EDT2 according to the prior art and F1 according to the invention.

The wires of the examples from Table 1 have a diameter d of greater than or equal to 0.10 mm and preferably greater than or equal to 0.12 mm. Moreover, the wires of the examples from Table 1 have a diameter d of less than or equal to 0.40 mm, preferably less than or equal to 0.25 mm, more preferably less than or equal to 0.23 mm and more preferably still less than or equal to 0.20 mm.

TABLE 1

|  | EDT1 | EDT2 | F1 | F2 |
| --- | --- | --- | --- | --- |
| C (%) | 0.71 | 0.585 | 0.03 | 0.03 |
| d (mm) | 0.18 | 0.18 | 0.15 | 0.18 |
| R (MPa) | 2820 | 2903 | 1901 | 1907 |

The wire F1 is such that the maximum tensile strength R of the wire, expressed in MPa, is such that R≥A+910.C−600.ln(d) with A=200 and d expressed in mm.

It will be noted that the wire F1 is such that A=400, preferably A=600 and more preferably A=700.

It will be noted that the wires F1 and F2 are such that R≥1200 MPa, preferably R≥1600 MPa and more preferably R≥1800 MPa.

Example of Process for Drawing the Wire According to the Invention

Figure 2:
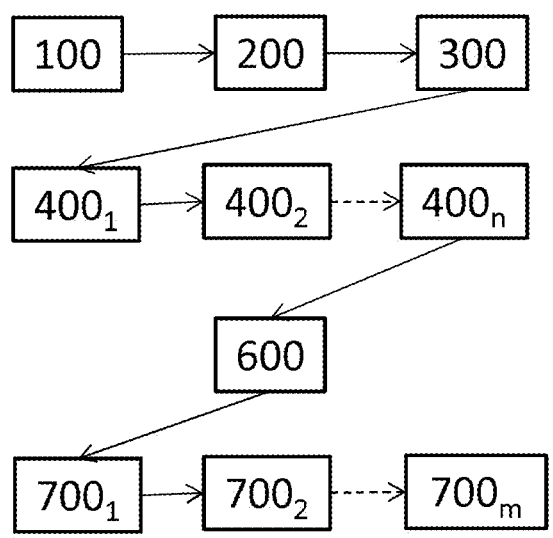
FIG. 2 is a diagram illustrating steps of a drawing process according to the invention.

Represented in FIG. 2 is a diagram of a process that makes it possible to draw the wires as described above.

In an uncoiling step 100, a steel wire of initial diameter preferably here equal to 5.5 mm and having a maximum tensile strength of between 300 MPa and 700 MPa, is uncoiled. The wire, referred to as wire stock, is stored in the form of a coil on a pay-off reel from which it is uncoiled using automated uncoiling means, for example an uncoiler. The steel microstructure is then ferritic-pearlitic.

In a step 200 of descaling the wire stock, the wire stock is passed into several successive pulleys and into two straighteners each formed by several pulleys, the pulleys of each straightener being rotatably mounted about an axis perpendicular to the axis of rotation of the pulleys of the other straightener. A layer of iron oxides, referred to as scale, present at the surface of the wire stock is thus removed.

In a step 300, the wire stock is coated with a layer of an adhesion promoter for a drawing lubricant.

The objective of steps $400_1$ to $400_n$ is to reduce the diameter of the wire from the initial diameter D to an intermediate diameter d', for example greater than or equal to 0.5 mm, preferably greater than or equal to 1 mm and more preferably greater than or equal to 1.3 mm and for example less than or equal to 2.5 mm, preferably less than or equal to 2.2 mm and more preferably less than or equal to 2 mm.

Steps $400_1$ to $400_n$ (n varying from 6 to 12) form a first uninterrupted series of steps of dry drawing the wire from the initial diameter D to the intermediate diameter d'. Each step $400_1$ to $400_n$ is a dry drawing step in which the wire is passed into a die having a diameter smaller than the diameter of the wire upstream of the die. Thus, the wire has a diameter downstream of the die that is smaller than the diameter upstream of the die. The diameter of each die is smaller than the diameter of the die located upstream. For the first uninterrupted series of steps of dry drawing the wire from the initial diameter D to the intermediate diameter d', the true strain is defined as $\varepsilon=2\cdot\ln(D/d')$.

Means for pulling the wire that are positioned downstream of each die, here capstans, make it possible to exert a pulling force sufficient to draw the wire through each die. A drawing lubricant in pulverulent form is used.

In a step 600, the wire of intermediate diameter d' is coated with at least one metal layer. The step 600 of coating the wire of intermediate diameter d' is selected from a step of depositing a layer of an alloy of substantially pure metals, a step of depositing a first layer of a first substantially pure metal followed by a step of depositing a second layer of a second substantially pure metal, and a step of depositing a layer of a substantially pure metal. Here, the step 600 of coating the wire of intermediate diameter d' is a step of depositing a step of depositing a first layer of a first substantially pure metal followed by a step of depositing a second layer of a second substantially pure metal, here a layer of copper then a layer of zinc.

The objective of steps $700_1$ to $700_m$ (m varying for example from 8 to 23) is to reduce the diameter of the wire from the intermediate diameter d' to the final diameter d and to increase the maximum tensile strength of the wire.

Steps $700_1$ to $700_m$ form a second uninterrupted series of steps of wet drawing the wire from the intermediate diameter d' to the final diameter d. Each step $700_1$ to $700_m$ is a wet drawing step in which the wire is passed into a die having a diameter smaller than the diameter of the wire upstream of the die. Thus, the wire has a diameter downstream of the die that is smaller than the diameter upstream of the die. The diameter of each die is smaller than the diameter of the die located upstream. For the second uninterrupted series of steps of wet drawing the wire from the intermediate diameter d' to the final diameter d, the true strain is defined as $\varepsilon'=2\cdot\ln(d'/d)$.

As a variant, steps $700_1$ to $700_m$ will be carried out in a dry environment.

Means for pulling the wire that are positioned downstream of each die, here stepped capstans, make it possible to exert a pulling force sufficient to draw the wire through each die. The pulling means and the dies are immersed in a liquid bath of drawing lubricant, for example as described in document WO 2008/113481.

The drawing process thus comprises N uninterrupted series of drawing steps, for example one in a dry environment and one in a wet environment. Here N=2. Thus, it is possible to define the total true strain for the drawing process as $\varepsilon T=2\cdot\ln(D/d)$.

Thus, the process comprises one or more intermediate steps between the first and second uninterrupted series of wire drawing steps $400_1$-$400_m$, $700_1$-$700_m$. During the or each of these intermediate steps, the wire has a temperature less than or equal to 300° C. Here, the process comprises a single intermediate step, here the coating step 600 during which the wire has a temperature of between 15° C. and 300° C. and preferably between 15° C. and 200° C.

The intermediate step or steps do not comprise a step of thermal diffusion of each first and second metal respectively into the second and first layer, here copper in the second layer and zinc in the first layer.

Neither do the intermediate step or steps comprise a step of heating the steel beyond its austenitizing temperature. Such austenitizing steps are described in particular in "Précis de métallurgie" [Precis on metallurgy], ISBN 2-12-260121-6 and also in "Atlas des courbes de transformation des aciers de fabrication francaise" [Atlas of transformation curves of steels of French manufacture], IRDIS, 1974.

Such a heating step is well known to those skilled in the art during heat treatments as described in particular in "Les principes de base du traitement thermique des aciers" [The basic principles of heat treatment of steels], André Constant and Guy Henry, ISBN 2-85330-083-8.

Figure 5:
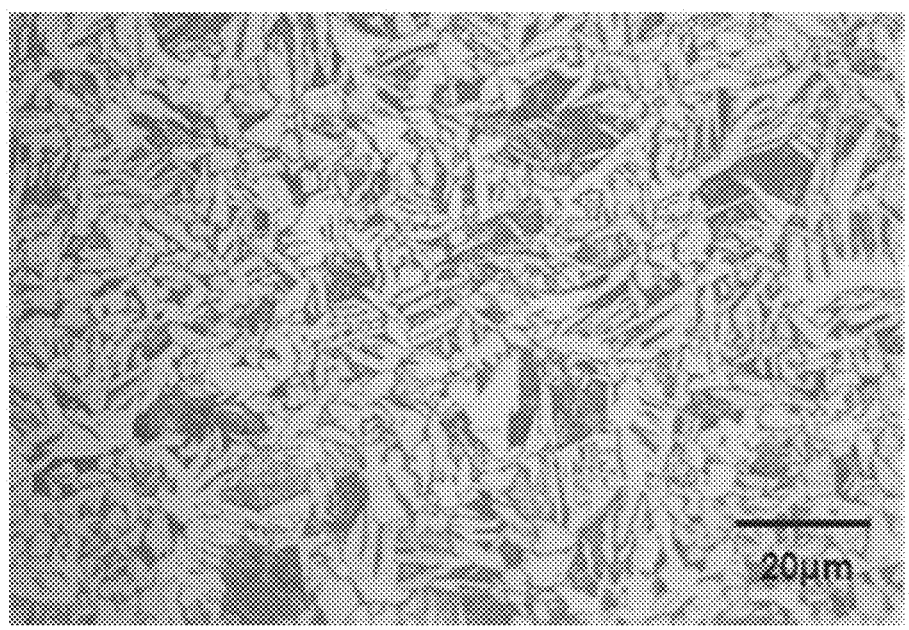
FIG. 5 is an optical microscope view of an acicular ferritic (Widmanstätten) microstructure.

The absence of heat treatment comprising generally a step of heating beyond the austenitizing temperature of the steel and then a cooling step makes it possible to avoid the associated problems. Thus, if the austenitizing is not sufficient, non-recrystallized bands remain and the austenite obtained is not homogeneous which is detrimental to the subsequent drawing. If the austenitizing is too great, the microstructure obtained during subsequent cooling is an acicular (Widmanstätten) ferrite, illustrated in FIG. 5, and not a ferritic-pearlitic structure.

Given in Table 2 are various values of the characteristics of the wires according to the invention and wires from the prior art.

TABLE 2

|  | EDT1 | EDT2 | F1 | F2 |
|---|---|---|---|---|
| C (%) | 0.71 | 0.585 | 0.03 | 0.03 |
| d' (mm) | 1 | 1.3 | 1.3 | 1.3 |
| d (mm) | 0.18 | 0.18 | 0.15 | 0.18 |
| $\varepsilon$ | 2.6 | 2.8 | 2.9 | 2.9 |
| $\varepsilon'$ | 3.6 | 4 | 4.3 | 4.0 |
| $\varepsilon T$ | 6.2 | 6.8 | 7.2 | 6.9 |

It will be noted that the true strain $\varepsilon'=2\cdot\ln(d'/d)$ is such that $3<\varepsilon'\leq5$ for the wires F1 and F2. Preferably, $\varepsilon'\geq3.5$, more preferably $\varepsilon'\geq3.7$ and more preferably still $\varepsilon'\geq4$ for the wires F1 and F2. It will also be noted that $\varepsilon'\leq4.7$ and preferably $\varepsilon'\leq4.5$ for the wires F1 and F2.

It will be noted that the true strain $\varepsilon=2\cdot\ln(D/d')$ is such that $2\leq\varepsilon\leq5$ for the wires F1 and F2.

It will also be noted that, for the wires F1 and F2, when $\varepsilon'\geq3.5$, preferably $\varepsilon'\geq3.7$ and more preferably $\varepsilon'\geq4$, the true strain $\varepsilon=2\cdot\ln(D/d')$ is such that $\varepsilon\leq4$, preferably $\varepsilon\leq3.5$ and more preferably $\varepsilon\leq3$.

It will also be noted that, for the wires F1 and F2, when $\varepsilon'\leq4.7$, preferably $\varepsilon'\leq4.5$, the true strain $\varepsilon=2\cdot\ln D/d')$ is such that $\varepsilon\geq2.3$, preferably $\varepsilon\geq2.5$ and more preferably $\varepsilon\geq2.7$.

It will also be noted that, for the wire F1, $\varepsilon T\geq6.5$, preferably $\varepsilon T\geq6.75$. It will also be noted that $\varepsilon T\leq8$ for the wires F1 and F2.

Comparative Tests and Trials

The wires from the prior art and the wires F1 and F2 were compared during a rotating bending test carried out in a wet atmosphere (at least 60% relative humidity).

This test makes it possible to measure the maximum rotating bending endurance stress in a wet environment $\sigma_F^*$ of each wire tested. During this test, the wire tested is subjected to $10^5$ cycles about its axis of revolution at a predetermined stress. If the wire breaks, the test is restarted with a lower stress and if the wire doesn't break, the test is restarted with a higher stress. The value of $\sigma_F^*$ is thus determined step-by-step, for example by the staircase method. The results of this test are given in Table 3 below:

TABLE 3

|  | EDT1 | EDT2 | F1 | F2 |
|---|---|---|---|---|
| C (%) | 0.71 | 0.585 | 0.03 | 0.03 |
| d (mm) | 0.18 | 0.18 | 0.15 | 0.18 |
| R (MPa) | 2820 | 2903 | 1901 | 1907 |
| $\sigma_F^*$ (MPa) | <500 | <500 | 1004 | 995 |

In a wet environment, the wires F1 and F2 according to the invention breaks at significantly higher stresses than those of the prior art, thus illustrating one of the advantages of the invention. Thus, even if the initial tensile strength of the wires F1 and F2 according to the invention is lower than that of the wires EDT1 and EDT2, the fatigue-corrosion endurance of the wires F1 and F2 is significantly greater than that of the wires EDT1 and EDT2.

The invention is not limited to the embodiments described above.

Indeed, the descaling step 200 may be carried out by the action of a chemical agent, for example acid.

The invention claimed is:

1. A process for drawing a steel wire, the steel wire having a microstructure that is selected from the group consisting of completely ferritic, a mixture of ferrite and cementite, and a mixture of ferrite and pearlite, and the wire having a weight content of carbon C such that C<0.05% and a weight content of chromium Cr such that Cr<12%, the process comprising:
   at least one first uninterrupted series of steps of drawing the wire from a diameter D to a diameter d';
   at least one second uninterrupted series of steps of drawing the wire of diameter d' to a diameter d;
   wherein, with D and d being expressed in mm, the true strain $\varepsilon T=2\ln(D/d)$ is such that $\varepsilon T\geq6$; and
   one or more intermediate steps between the first and second uninterrupted series of steps of drawing the wire, the wire having a temperature less than or equal to 300° C. during the one or more intermediate steps, wherein the one or more intermediate steps do not comprise a heat treatment step during which the steel of the steel wire is heated beyond an austenitizing temperature of the steel.

2. The process according to claim 1, wherein d' is greater than or equal to 0.5 mm.

3. The process according to claim 2, wherein d' is greater than or equal to 1 mm.

4. The process according to claim 3, wherein d' is greater than or equal to 1.3 mm.

5. The process according to claim 1, wherein d' is less than or equal to 2.5 mm.

6. The process according to claim 5, wherein d' is less than or equal to 2.2 mm.

7. The process according to claim 6, wherein d' is less than or equal to 2 mm.

8. The process according to claim 1, wherein, with d' and d being expressed in mm, the true strain $\varepsilon'=2\ln(d'/d)$ is such that $\varepsilon'>3$.

9. The process according to claim 8, wherein, with d' and d being expressed in mm, the true strain $\varepsilon'=2\ln(d'/d)$ is such that $\varepsilon'\geq3.5$.

10. The process according to claim 9, wherein, with d' and d being expressed in mm, the true strain $\varepsilon'=2\ln(d'/d)$ is such that $\varepsilon'\geq3.7$.

11. The process according to claim 10, wherein, with d' and d being expressed in mm, the true strain $\varepsilon'=2\ln(d'/d)$ is such that $\varepsilon'\geq4$.

12. The process according to claim 1, wherein, with d' and d being expressed in mm, the true strain $\varepsilon'=2\ln(d'/d)$ is such that $\varepsilon'\leq5$.

13. The process according to claim 12, wherein, with d' and d being expressed in mm, the true strain $\varepsilon'=2\ln(d'/d)$ is such that $\varepsilon'\leq4.7$.

14. The process according to claim 13, wherein, with d' and d being expressed in mm, the true strain $\varepsilon'=2\ln(d'/d)$ is such that $\varepsilon'\leq4.5$.

15. The process according to claim 1, wherein, with D and d' being expressed in mm, the true strain $\varepsilon=2\ln(D/d')$ is such that $\varepsilon\geq2$.

16. The process according to claim 15, wherein, with D and d' being expressed in mm, the true strain $\varepsilon=2\ln(D/d')$ is such that $\varepsilon\geq2.3$.

17. The process according to claim 16, wherein, with D and d' being expressed in mm, the true strain $\varepsilon=2\ln(D/d')$ is such that $\varepsilon\geq2.5$.

18. The process according to claim 17, wherein, with D and d' being expressed in mm, the true strain $\varepsilon=2\ln(D/d')$ is such that $\varepsilon\geq2.7$.

19. The process according to claim 1, wherein, with D and d' being expressed in mm, the true strain $\varepsilon=2\ln(D/d')$ is such that $\varepsilon\leq5$.

20. The process according to claim 19, wherein, with D and d' being expressed in mm, the true strain $\varepsilon=2\ln(D/d')$ is such that $\varepsilon\leq4$.

21. The process according to claim 20, wherein, with D and d' being expressed in mm, the true strain $\varepsilon=2\ln(D/d')$ is such that $\varepsilon\leq3.5$.

22. The process according to claim 21, wherein, with D and d' being expressed in mm, the true strain $\varepsilon=2\ln(D/d')$ is such that $\varepsilon\leq3$.

23. The process according to claim 1, wherein, with D and d being expressed in mm, the true strain $\varepsilon T=2\ln(D/d)$ is such that $\varepsilon T\geq6.5$.

24. The process according to claim 23, wherein, with D and d being expressed in mm, the true strain $\varepsilon T = 2 \ln (D/d)$ is such that $\varepsilon T \geq 7$.

25. The process according to claim 1, wherein, with D and d being expressed in mm, the true strain $\varepsilon T = 2 \ln (D/d)$ is such that $\varepsilon T \leq 8$.

26. The process according to claim 1, wherein D is greater than or equal to 4 mm.

27. The process according to claim 26, wherein D is greater than or equal to 5 mm.

28. The process according to claim 1, wherein the one or more intermediate steps comprise a step of coating the wire of diameter d' with at least one metal layer.

29. The process according to claim 28, wherein the step of coating the wire of diameter d' is selected from the group consisting of a step of depositing a layer of an alloy of substantially pure metals, a step of depositing a first layer of a first substantially pure metal followed by a step of depositing a second layer of a second substantially pure metal, and a step of depositing a layer of a substantially pure metal.

30. The process according to claim 28, wherein the step of coating the wire of diameter d' comprises a step of depositing a first layer of a first substantially pure metal followed by a step of depositing a second layer of a second substantially pure metal, and the one or more intermediate steps do not comprise a step of thermal diffusion of each of the first and second substantially pure metals respectively into the second and first layers.

31. A process for drawing a steel wire, the steel wire having a microstructure that is selected from the group consisting of completely ferritic, a mixture of ferrite and cementite, and a mixture of ferrite and pearlite, and the wire having a weight content of carbon C such that C<0.05% and a weight content of chromium Cr such that Cr<5%, the process comprising:
  at least one first uninterrupted series of steps of drawing the wire from a diameter D to a diameter d';
  at least one second uninterrupted series of steps of drawing the wire of diameter d' to a diameter d;
  wherein, with D and d being expressed in mm, the true strain $\varepsilon T = 2 \ln (D/d)$ is such that $\varepsilon T \geq 6$; and
  one or more intermediate steps between the first and second uninterrupted series of steps of drawing the wire, the wire having a temperature less than or equal to 300° C. during the one or more intermediate steps,
  wherein the one or more intermediate steps do not comprise a heat treatment step during which the steel of the steel wire is heated beyond an austenitizing temperature of the steel.

* * * * *